(12) United States Patent
Dubey et al.

(10) Patent No.: US 11,881,884 B2
(45) Date of Patent: Jan. 23, 2024

(54) RECEIVER CIRCUITRY HAVING A TRANSISTOR PAIR FOR INPUT VOLTAGE CLIPPING

(71) Applicant: XILINX, INC., San Jose, CA (US)

(72) Inventors: Hari Bilash Dubey, Hyderabad (IN); Lanka Sasi Rama Subrahmanyam, Challapalli (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/698,871

(22) Filed: Mar. 18, 2022

(65) Prior Publication Data
US 2023/0299802 A1 Sep. 21, 2023

(51) Int. Cl.
*H04B 1/18* (2006.01)
*H04B 1/16* (2006.01)

(52) U.S. Cl.
CPC ............. *H04B 1/18* (2013.01); *H04B 1/1676* (2013.01)

(58) Field of Classification Search
CPC .................................. H04B 1/18; H04B 1/1676
See application file for complete search history.

(56) References Cited

U.S. PATENT DOCUMENTS

| 7,495,589 | B1* | 2/2009 | Trifonov | H03M 3/382 |
| | | | | 341/120 |
| 2004/0100317 | A1* | 5/2004 | Suzunaga | H04B 10/69 |
| | | | | 327/307 |
| 2013/0077801 | A1* | 3/2013 | Tarnowski | H03G 7/004 |
| | | | | 381/94.1 |

* cited by examiner

*Primary Examiner* — Nguyen T Vo
(74) *Attorney, Agent, or Firm* — Patterson + Sheridan, LLP

(57) ABSTRACT

Receiver circuitry for an input/output device includes first stage circuitry and second stage. The first stage circuitry has a first input to receive an input signal, voltage adjustment circuitry, and differential amplifier circuitry. The first stage circuitry is coupled to the first input and has a transistor pair to receive the input signal, and adjust a voltage value of the input signal to generate an adjusted signal. The differential amplifier circuitry receives the adjusted signal and a reference signal, and generates a first differential signal and a second differential signal. The second stage circuitry receives the first differential signal and the second differential signal, and generates an output signal based on the first differential signal and the second differential signal.

20 Claims, 8 Drawing Sheets

RECEIVER CIRCUITRY HAVING A TRANSISTOR PAIR FOR INPUT VOLTAGE CLIPPING

TECHNICAL FIELD

Examples of the present disclosure generally relate to receiver circuitry for a high speed input/output device, and, more particularly, to receiver circuitry for a high speed input/output device having a transistor pair for input voltage clipping.

BACKGROUND

A high bandwidth memory (HBM) device includes a three dimensional (3D) stack of dynamic random access memory (DRAM) and an input/output (I/O) device that communicates with the 3D DRAM stack. The 3D DRAM stack is integrated within a System-on-Chip (SoC) device via an interposer. The input/output (I/O) device transmits and receives data to and from the 3D DRAM stack. An input signal received by the I/O device transitions between a first and second data rate. As the data rate increases, the timing budgets of the I/O device are decreased, imposing constraints on the transmitter/receiver (TX/RX) specifications (e.g., duty cycle distortion and data dependent jitter, among others) of the I/O device. Further, at the lower technology nodes (e.g., a technology node 7 nm or less) used to manufacture the I/O device, the upper voltage value of the input signal may exceed the operating thresholds of the transistors within the I/O device, generating defects within the I/O device.

Various methods have been used to limit the voltage range of the input signal. A resistor divider is added to the I/O device to reduce the voltage range of the input signal to be within the operating thresholds of the transistors within the I/O device. However, the resistor divider reduces the gain of the I/O device at higher frequencies, and increases the circuit area of the I/O device, decreasing the performance of the I/O device and increasing the manufacturing cost of the I/O device.

SUMMARY

An Input/output (I/O) device includes receiver circuitry. The receiver circuitry receives an input signal and clips the voltage values of the input signal. The voltage values of the input signal are clipped such that the voltage values of the input signal are within the operating thresholds of the transistors of the receiver circuitry. The receiver circuitry includes a transistor pair that receives the input signal and clips the voltage values of the input signal. The transistor pair includes a first transistor that clips (e.g., reduces) the upper voltage value of the input signal and a second transistor that clips (e.g., increases) the lower voltage value of the input signal. Further, a transistor is connected between the output of the transistor pair and ground, and maintains a voltage at the output of the transistor pair to be less than a reliability threshold voltage.

In one example, receiver circuitry comprises first stage circuitry having a first input to receive an input signal and second stage circuitry. The first stage circuitry includes voltage adjustment circuitry coupled to the first input and comprising a transistor pair configured to receive the input signal, and adjust a voltage value of the input signal to generate an adjusted signal. The differential amplifier circuitry receives the adjusted signal and a reference signal, and generates a first differential signal and a second differential signal based on the adjusted signal and the reference signal. The second stage circuitry receives the first differential signal and the second differential signal, and generates an output signal based on the first differential signal and the second differential signal.

In one example, stage circuitry includes a first input to receive an input signal, and voltage adjustment circuitry coupled to the first input and comprising a transistor pair to receive the input signal, and adjust a voltage value of the input signal to generate an adjusted signal. The stage circuitry further includes differential amplifier circuitry receives the adjusted signal and a reference signal, and generates a first differential signal and a second differential signal based on the adjusted signal and the reference signal. The differential amplifier circuitry includes a first output to output the first differential signal, and a second output to output the second differential signal.

In one example, a method includes receiving, via a transistor pair of receiver circuitry, an input signal. Further, the method includes adjusting, via the transistor pair, a voltage value of the input signal to generate an adjusted signal, and generating a first differential signal and a second differential signal based on the adjusted signal and a reference signal. The method further includes outputting the first differential signal and the second differential signal.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
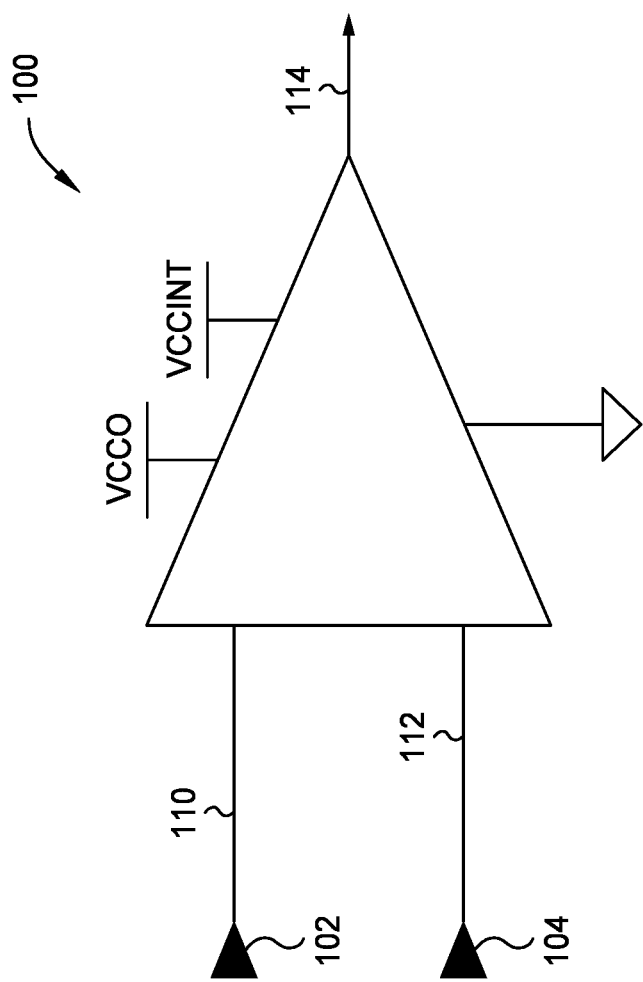
FIG. 1 depicts an example receiver circuitry, according to an example.

A high bandwidth memory (HBM) device includes one or more input/output (I/O) devices and a three dimensional (3D) stack of dynamic random access memories (DRAMs).

The I/O device receives an input signal and communicates the input signal to memory elements (DRAMs) of the HBM device. The I/O device includes receiver circuitry (HBMIO receiver circuitry). The receiver circuitry operates at a voltage of a power supply signal Vcco (e.g., about 1.2 V). The receiver circuitry receives the input signal and a reference signal. The reference signal has a voltage value of about 0.5*Vcco. The receiver circuitry is a reference-based comparison circuit that detects whether the input signal is a logic 1 (e.g., high voltage) or a logic 0 (e.g., a low voltage) based on the input signal and the reference signal. The input signal transitions (e.g., swings) from about +/−200 mV to about +/−0.5*Vcco. The common mode voltage is 0.5*Vcco.

The receiver circuitry includes amplifier circuitry. In a read mode, based on the input signal exceeding a first voltage threshold (e.g., Vidh) of the amplifier, the amplifier detects a logic 1 (or logic high). Further, based on the input signal being less than a second voltage threshold (e.g., Vidl), the amplifier detects a logic 0 (or logic low).

In various instances, the receiver circuitry includes two stages (e.g., first stage circuitry and second stage circuitry) that are serially connected with each other. The first stage circuitry includes a P-type metal-oxide-semiconductor field effect (MOSFET), or PMOS, differential amplifier. A core transistor of the differential amplifier is prone to time-dependent dielectric breakdown (e.g., TDDB), causing errors within the differential amplifier. The PMOS differential amplifier has a resistor load, and operates at the power supply voltage of the I/O device (e.g., Vcco). The second stage includes a complementary metal-oxide-semiconductor (CMOS) conversion circuit and operates at a second power supply (e.g., Vccint). The PMOS differential amplifier includes two PMOS transistors as core transistors. The gate of the first PMOS transistor receives the input signal and the gate of the second PMOS transistor receives the reference voltage. The technology node (e.g., 16 nm or 7 nm, among others) of the transistors defines the gate tolerance limit of the transistors. For example, in a 16 nm technology node, the gate tolerance limit is greater than the power supply voltage of the I/O device. Accordingly, in a 16 nm technology node, the transistors do not experience time-dependent dielectric breakdown (e.g., TDDB). However, in lower technology nodes, e.g., a 7 nm technology node, the gate tolerance limit of the transistors is less than the upper voltage value of the input signal. When the gate tolerance limit of the transistors is less than the upper voltage value of the input signal, the transistors experience TDDB, and defects occur within the PMOS differential amplifier. Accordingly, as the size of the technology nodes decreases, errors occur within the I/O device, causing errors within the corresponding HBM device.

In various examples, the voltage level of the input signal is limited such that the voltage value of the input signal does not exceed the gate tolerance limit of the transistors of the PMOS differential amplifier. In one example, the upper voltage value of the input signal is limited to be less than 1.0 V. In a typical I/O device, a resistor divider is included to reduce the upper voltage value of the input signal before the input signal is received by the PMOS differential amplifier. However, the use of a resistor divider reduces the gain of the PMOS differential amplifier. Further, the additional resistors added to the I/O device increases the circuit area of the I/O device, increasing the manufacturing cost of the corresponding integrated circuit (IC) device. Additionally, the resistor divider increases the input current from the input to a ground node within the receiver circuitry.

In the following, an I/O device that reduces the voltage value of an input signal to not exceed a gate tolerance of the transistors is described. As is described in further detail in the following, a PMOS differential amplifier of the I/O device includes a transistor pair that adjusts (e.g., clips) the upper (e.g., maximum) and lower (e.g., minimum) voltage values of the input signal. As compared to an I/O device that includes a resistor divider, an I/O device that includes a transistor pair uses less circuit area, reducing the circuit area of the I/O device, and reducing the cost of the corresponding IC device. Further, the use of the transistor pair does not induce a loss of gain within the PMOS differential amplifier, or generate additional input current within the PMOS differential amplifier.

FIG. 1 illustrates receiver circuitry 100 of an I/O device, according to one or more examples. In one example, the receiver circuitry 100 is a receiver for a high bandwidth memory (HBM) device. A HBM device includes a three-dimensional (3D) stack of memory devices. For example, a HBM device may include a 3D stack of DRAMs. The receiver circuitry 100 receives data from the memory devices. The HBM device may be integrated within a System-on-Chip (SoC) device via an interposer. In one example, the receiver circuitry 100 is included within a controller. Two or more receiver circuitries 100 may be included within a controller.

The receiver circuitry 100 receives the power supply signals Vcco and Vccint. Further, the receiver circuitry 100 receives a reference voltage signal. The power supply signals Vcco and Vccint are received from one or more power supply devices. Accordingly, the receiver circuitry 100 is coupled to the one or more power supply devices to receive the power supply signals Vcco and Vccint. The receiver circuitry 100 is further coupled to a ground node that is held (e.g., driven) with a ground signal or another reference signal.

The power supply signal Vcco has a voltage value in a range of about 1.10 V to about 1.3 V. In one example, the power supply signal Vcco has a voltage value of about 1.2 V. In other examples, the voltage value of the power supply signal Vcco is greater than 1.3 V or less than 1.10 V. Further, the power supply signal Vcco is a direct current (DC) voltage.

The power supply signal Vccint has a value in a range of about 0.73 V to about 0.925 V. In one or more examples, the power supply signal Vccint has a voltage value that is greater than 0.925 V or less than 0.73 V. In one example, the power supply signal Vccint has a value of about 0.85 V.

The receiver circuitry 100 supports a data rate of about 2 Gbps to about 3.2 Gbps. Accordingly, the receiver circuitry 100 is configured to receive and process an input signal (e.g., the input signal 110) that has a data rate of about 2 Gbps to about 3.2 Gbps. In other examples, the receiver circuitry 100 supports a data rate that is less than 2 Gbps or that is greater than 3.2 Gbps.

The receiver circuitry 100 receives the input signal 110 via input node 102. The input signal 110 toggles between a first voltage and a second voltage. The first voltage is about 0V and the second voltage is about VCCO. In one example, the input signal 110 toggles between about 0 V and about 1.2 V. In another example, the input signal 110 toggles between other voltage values. Further, the input signal 110 may toggle between the first voltage and the second voltage at a data rate. The data rate may be about 3.2 Gbps. In other examples, the date rate may be greater than or less than 3.2 Gbps.

The reference signal 112 is received via the input node 104. The reference signal 112 is about one half of the voltage value of the power supply signal Vcco. In other examples, the reference signal 112 is greater than or less than about one half of the voltage value of the power supply signal Vcco. The reference signal 112 is a DC voltage signal.

The receiver circuitry 100 is a reference-based comparison circuitry. For example, the receiver circuitry 100 compares the input signal 110 with the reference signal 112 to generate the output signal 116. The reference signal 112 is the detection signal. The input signal 110 has a voltage swing of about +/−200 mV to about +/−0.5*Vcco.

In a read mode, voltage thresholds Vidh and Vidl are used to detect a logic low (e.g., logic 0) and a logic high (logic 1) within the input signal 110. The voltage value of the voltage threshold Vidh is greater than the voltage value of the reference signal 112. The voltage value of the voltage threshold Vidl is less than the voltage value of the reference signal 112. In one example, the voltage value of the voltage threshold Vihd is about 0.2 V greater the voltage value of the reference signal 112. Further, the voltage value of the voltage threshold Vidl is about 0.2 V less than the voltage value of the reference signal 112. The magnitude of the voltage threshold Vidh and the magnitude of the voltage threshold Vidl are equal to each other. In one example, when the voltage value of the input signal 110 is greater than Vidh, a logic high is detected. Further, when the voltage value of the input signal 110 is less than Vidl, a logic low is detected. A logic low may correspond to 0 V or a ground voltage value. A logic high may correspond to Vccint. In one example, based on detecting a logic high, the output signal 114 has a value of Vccint. Further, based on detecting a logic low, the output signal 114 has a value of ground voltage or 0 V.

Figure 2:
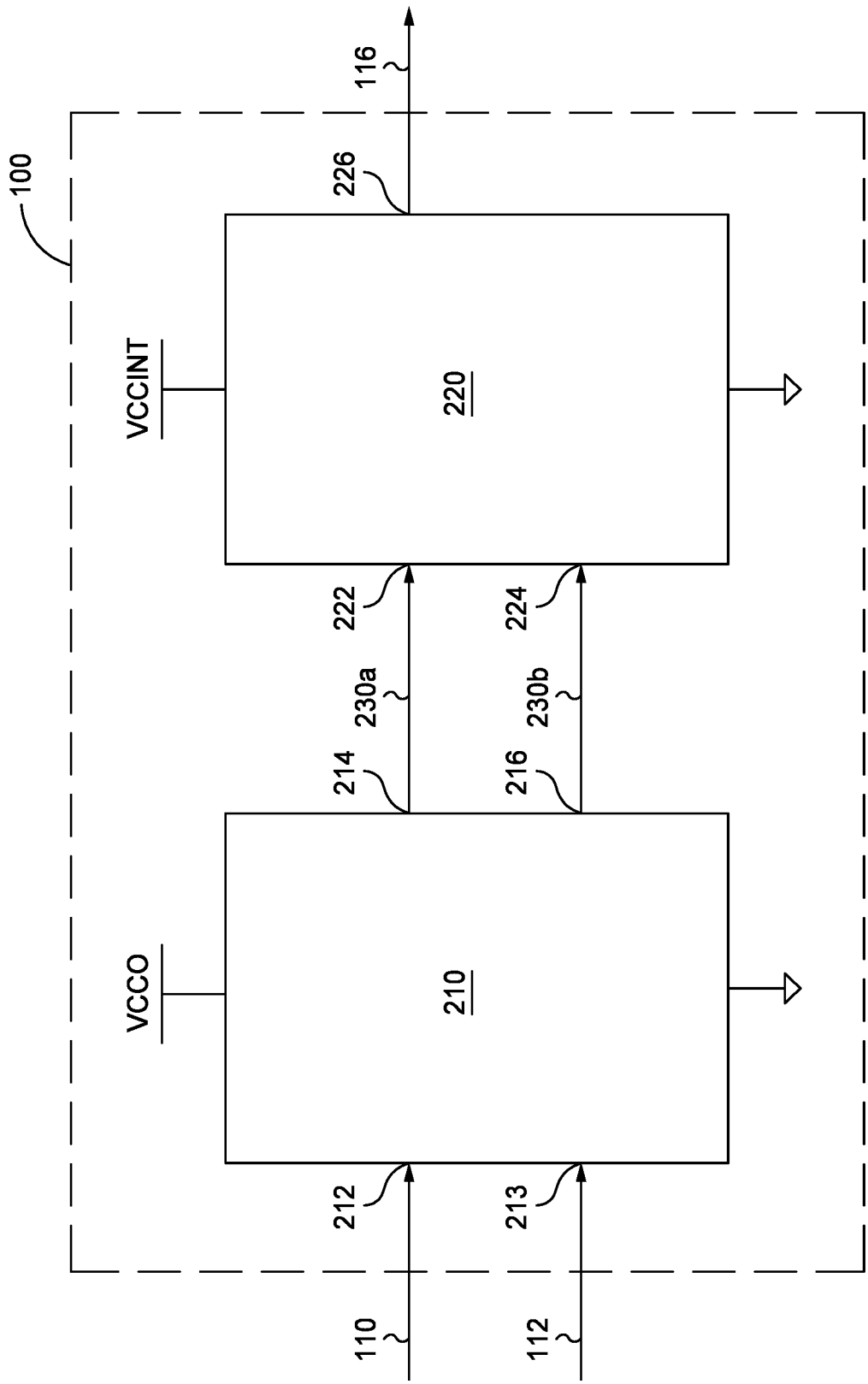
FIG. 2 depicts a block diagram of the receiver circuitry, according to an example.

FIG. 2 illustrates the receiver circuitry 100, according to one or more examples. As illustrated in FIG. 2, the receiver circuitry 100 includes stage circuitry 210 (e.g., a first stage) and stage circuitry 220 (e.g., a second stage). An input 212 of the stage circuitry 210 receives the input signal 110 and an input 213 of the stage circuitry 210 receives the reference signal 112. Further, the stage circuitry 210 receives the power supply signal Vcco.

The stage circuitry 210 generates a differential output 230 (e.g., differential signals 230a and 230b) via outputs 214 and 216. The stage circuitry 210 is electrically connected to the stage circuitry 220. For example, the outputs 214 and 216 of the stage circuitry 210 are electrically connected to the inputs 222 and 224 of the stage circuitry 220. The stage circuitry 220 generates the output signal 116 based on the differential signals 230a and 230b.

The stage circuitry 210 adjusts (e.g., clips) the voltage of the input signal 110. For example, the stage circuitry 210 clips the upper and lower voltage values of the input signal 110, reducing the voltage swing of the input signal. For example, the stage circuitry 210 includes a transistor pair at the input 212 that clip the upper and lower the voltage values of the input signal 110.

Figure 3:
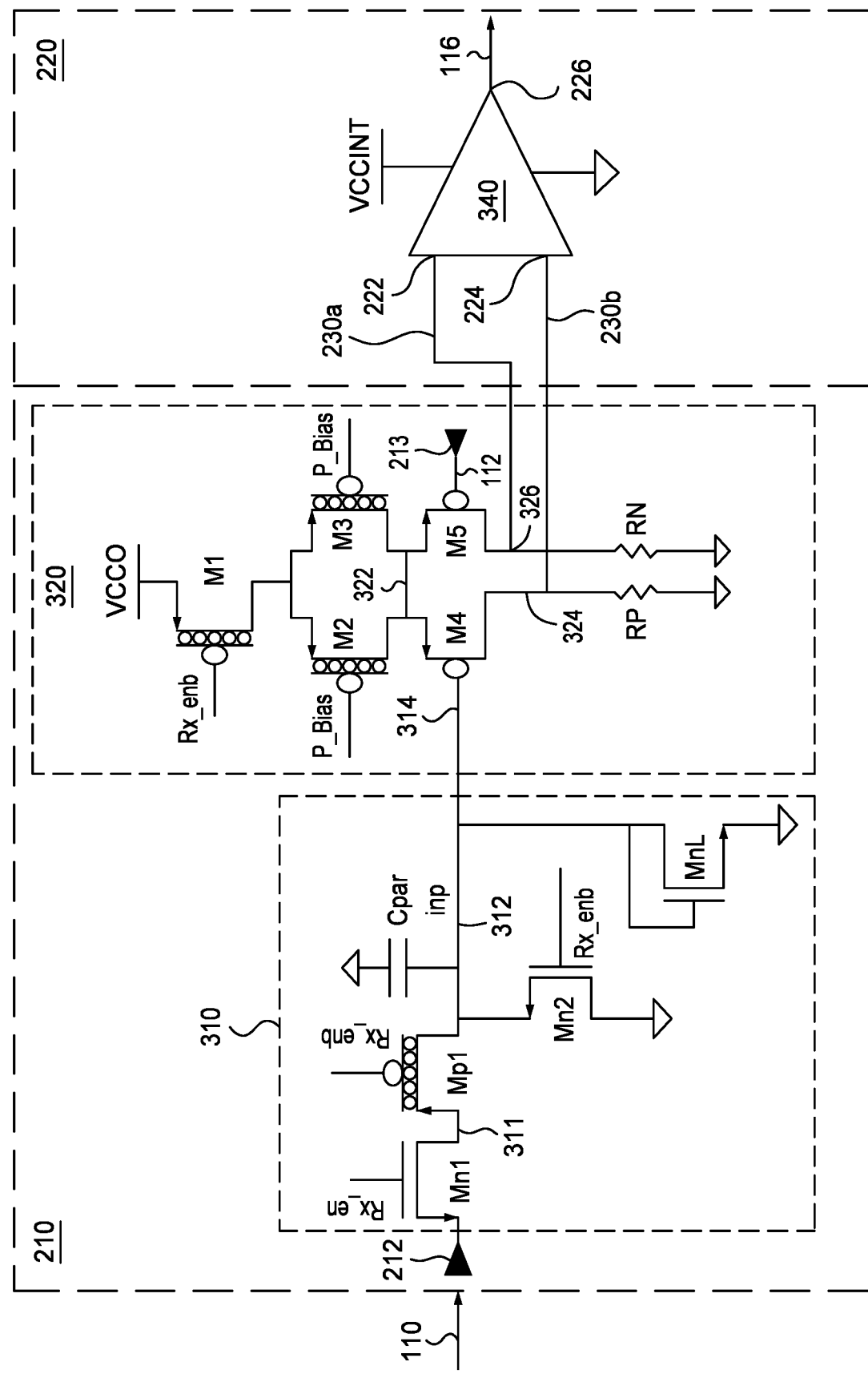
FIG. 3 depicts schematic diagram of first stage circuitry and second stage circuitry of the receiver circuitry, according to an example.

FIG. 3 illustrates a schematic diagram of the stage circuitry 210 and the stage circuitry 220 of the receiver circuitry 100. The stage circuitry 210 includes voltage adjustment circuitry 310 and differential amplifier circuitry 320. An input of the voltage adjustment circuitry 310 receives the input signal 110. The voltage adjustment circuitry 310 adjusts the voltage values of the voltage adjustment circuitry 310 and outputs an adjusted signal 314 via node 312. The output of the voltage adjustment circuitry 310 is connected to a first input of the differential amplifier circuitry 320. A second input of the differential amplifier circuitry 320 receives the reference signal 112. The differential amplifier circuitry 320 outputs first and second differential signals (e.g., differential signals 230a, 230b) via outputs 324 and 326. The differential amplifier circuitry 320 generates the differential signals 230a, 230b based on the adjusted signal 314 and the reference signal 112.

The voltage adjustment circuitry 310 includes a transistor pair 311, transistor Mn2, transistor MnL, and capacitor Cpar (parasitic capacitor). The transistor pair 311 includes transistors Mn1 and Mp1. The transistors Mn1 and Mp1 are coupled in series with each other. The transistor Mn1 is an NMOS (N-type metal-oxide-semiconductor field effect (MOSFET)) transistor. The source of the transistor Mn1 is connected to the input 212, the gate of the transistor Mn1 receives the enable signal Rx_en, and the drain of the transistor Mn1 is connected to the transistor Mp1. The transistor Mp1 is a PMOS (P-type MOSFET) transistor. The source of the transistor Mp1 is connected to the drain of the transistor Mn1, the gate of the transistor Mp1 receives the enable signal Rx_enb, and the drain of the transistor Mp1 is connected to the node 312.

In one example, the transistor Mn1 functions as an NMOS pass gate (or pass transistor) that clips (e.g., attenuates or reduces) the upper voltage value of the input signal 110. The transistor Mn1 is a weak 1 transistor as the transistor Mn1 clips the upper voltage value of the input signal 110. The transistor Mn1 turns off when the voltage of the input signal 110 is at least equal to $V_{GATE}-V_{tn}$, clipping the output voltage of the transistor Mn1 to be less than or equal to $V_{GATE}-V_{tn}$. $V_{tn}$ is the threshold voltage of the transistor Mn1. $V_{GATE}$ is the voltage at the gate of the transistor Mn1. $V_{GATE}$ is the voltage value of the enable signal RX_en. The enable signal RX_en transitions from a lower voltage of about 0 V to an upper voltage of Vcco.

In one example, the voltage at the source of transistor Mn1 is $V_S$. $V_S$ is gradually charged from 0 V to $V_{GATE}$. When $V_S$ reaches $V_{GATE}-V_{tn}$, the gate source voltage $V_{GS}$ is $(V_G-V_S)$. By substituting $V_{GATE}-V_{tn}$ for $V_S$, $V_{GS}$ can be rewritten as $V_{GATE}-(V_{GATE}-V_{tn})=V_{tn}$. $V_{tn}$ is the minimum voltage required for the transistor Mn1 to be turned on (e.g., ON state) and for current to flow between the source and drain of the transistor Mn1. Accordingly, when the voltage level at the source of the transistor Mn1 is greater than $V_{GATE}-V_{tn}$, the transistor Mn1 is turned off (e.g., OFF state). When the voltage at the source of the transistor Mn1 is 0 V, the voltage at the drain of the transistor Mn1 is 0 V.

The transistor Mp1 functions as a PMOS pass gate (or pass transistor) that clips (e.g., limits or increases) the lover voltage value of the input signal 110. The transistor Mp1 is a weak 0 transistor as the transistor Mp1 clips the lower voltage value of input signal 110. The transistor Mp1 turns off when the voltage at the drain reaches $V_{tp}$ (e.g., the threshold voltage for transistor Mp1), the voltage VSG (e.g., the difference between the voltage at the source of the transistor Mp1 and the voltage at the gate of the transistor Mp1) is $V_{tp}-0$. $V_{tp}-0$ is the minimum voltage for the transistor Mp1 to be turned on and for current to flow from the source to drain in the transistor Mp1. Accordingly, when the voltage of the drain of the transistor mp1 is less than $V_{tp}$, the transistor Mp1 is turned off, and current does not flow from the source to drain of the transistor Mp1. The output of the transistor Mp1 is a logic 0 (e.g., 0 volts) when VSG is less than $V_{tp}$.

The gate of the transistor Mp1 receives the enable signal Rx_enb. The enable signal Rx_enb transitions from a voltage value of about 0 V to a voltage value of Vcco. In one example, the enable signal Rx_enb is the inverted version of the enable signal RX_en. Accordingly, in such an example, when the enable signal Rx_en has a high voltage value (e.g., Vcco), the enable signal Rx_enb has a low voltage value (e.g., 0 V), and when the enable signal Rx_en has a low voltage value (e.g., 0 V), the enable signal Rx_enb has a high voltage value (e.g., Vcco). Further, as the enable signal Rx_enb is the inverted version of the enable signal Rx_en, when the transistors Mn1 and Mp1 are turned on at the same time and turned off at the same time.

Turning on the transistors Mn1 and Mp1 at the same time clips (e.g., adjusts) the maximum voltage of the input signal 110 and the minimum voltage of the input signal 110. In one example, turning on the transistors Mn1 and Mp1 at the same time clips the voltage swing of the input signal 110 to between $V_{tp}$ to Vcco–$V_{tn}$, even when the input signal 110 has a voltage swing between 0 V and Vcco.

Figure 4:
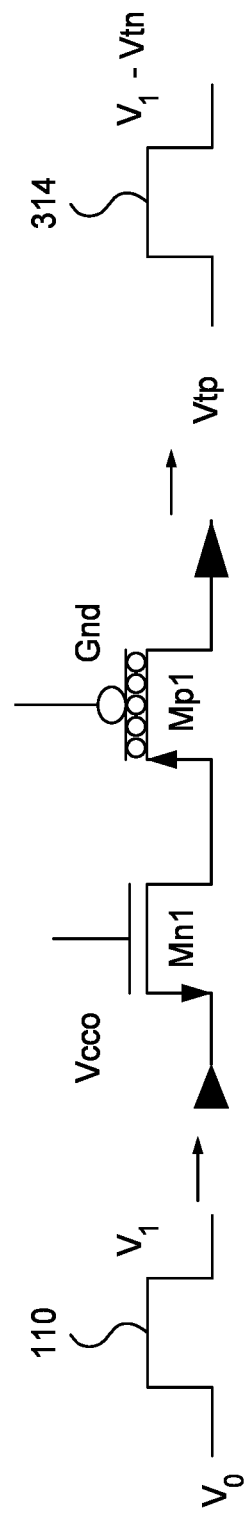
FIG. 4 depicts an input signal and an adjusted signal, according to an example.

FIG. 4 illustrates an example of the transistors Mn1 and Mp1. As illustrated in FIG. 4, the gate of the transistor Mn1 receives the power supply signal Vcco, and the gate of the transistor Mp1 receives a ground signal. The source of the transistor Mn1 receives the input signal 110 that transitions between voltage V0 and voltage V1. In one example, voltage V0 is 0 V and voltage V1 is Vcco. In other examples, the voltage V0 is a voltage less than the voltage V1, and the voltage V1 may be greater or less than Vcco. As is described above, the transistor Mn1 clips (e.g., attenuates) the voltage V1 to be V1–$V_{tn}$. The transistor Mp1 clips (e.g., increases or limits) the voltage V0 to be the voltage $V_{tp}$. Accordingly, the adjusted signal 314 output by the transistor pair Mn1 and Mp1 transitions between Vtp (which is greater than V0) and V1–Vtn.

The capacitor Cpar is connected between the node 312 and ground. Further, the transistor Mn2 is connected between the node 312 and ground. The transistor Mn2 is an NMOS transistor. The source of the transistor Mn2 is connected to the node 312, the drain of the transistor Mn2 is connected to ground, and the gate of the transistor Mn2 receives the enable signal Rx_enb. When the transistors Mn1 and Mp1 are turned off, the transistor Mn2 is turned on. Further, when the transistors Mn1 and Mp1 are turned on, the transistor Mn2 is turned off. Turning on the transistor Mn2 provides a path from the node 312 to ground, discharging the capacitor Cpar.

The transistor MnL is connected to the node 312. The transistor MnL is an NMOS transistor. The drain of the transistor MnL is connected to the node 312 and to the gate of the transistor MnL. The source of the transistor MnL is connected to a ground voltage node. As the gate of the transistor MnL is connected to the drain of the transistor MnL, the transistor MnL is a diode connected transistor. Accordingly, the transistor MnL functions as a two terminal device.

The transistor MnL provides a path between the node 312 and the ground node. In one example, the input signal 110 maintains a high voltage value (e.g., logic 1 or Vcco) for a long period of time (e.g., greater than about 1 ms), leakage current from the transistors Mn1 and Mp1 charges the capacitor Cpar. In one example, the input signal 110 transitions between a first and second voltage every X ms. In such an example, a period of time longer than X ms may be a long period of time. In one example, X is less than 1 ms. When the input signal 110 maintains a high voltage value for a long period of time (e.g., greater than about 1 ms), the voltage value of the adjusted signal 314 at the node 312 exceeds 1 V. As the gate of the transistor M4 is connected to the node 312, when the voltage value of the node 312 exceeds 1 V, the transistor M4 is stressed, and may result in TDDB of the transistor M4, causing a defect in the transistor M4. The transistor MnL provides a leakage path between the node 312 and the ground voltage node, reducing the voltage value of the adjusted signal 314 at the node 312. In one example, when the voltage of the adjusted signal 314 at the node 312 exceeds a threshold voltage (e.g., greater than or equal to about 1 V), the transistor MnL turns on and discharges the node 312. The transistor MnL provides a path from the node 312 to the ground node. Accordingly, the transistor MnL maintains the voltage of the adjusted signal 314 at the node 312 to be less than the reliability threshold voltage (e.g., about 1 V).

Figure 5:
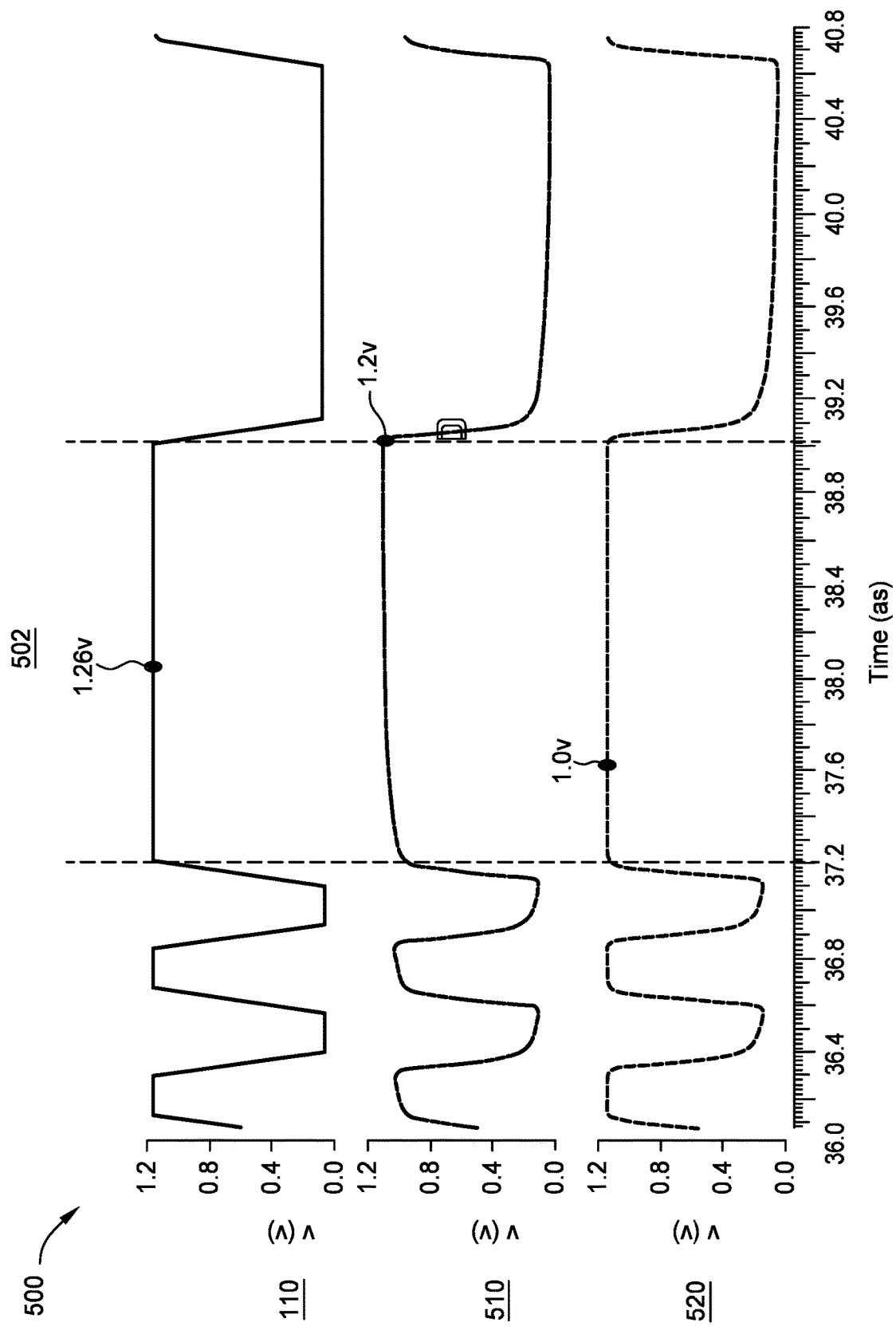
FIG. 5 depicts example waveforms of an adjusted signal, according to an example.

FIG. 5 illustrates a graph 500 illustrate waveforms of the input signal 110, signal 510, and signal 520. The signal 510 corresponds to the signal 314 in an example where the transistor MnL is omitted, and the signal 520 corresponds to the signal 314 in an example where the transistor MnL is included. The time period 502 corresponds to a period where the input signal 110 maintains a high voltage value (e.g., 1.2 V) for a long period of time (e.g., greater than about 1 ms). As is illustrated in FIG. 5, the voltage value of the signal 510 increases during the period 502, exceeding 1.0 V to be 1.2 V. However, during the time period 502, the signal 520 maintains a voltage value of 1.0 V. The voltage value of the signal 510 exceeds the reliability threshold voltage of the transistor M4, and the voltage value of the signal 520 does not exceed the reliability threshold voltage of the transistor M4. Accordingly, the transistor MnL mitigates defects within the transistor M4.

The transistors M1-M5, and the resistors RP and RN form the differential amplifier circuitry 320. The resistors RP and RN provide a resistance load, generating differential signals 230a and 230b from a current signal. The transistor M1 has a source configured to receive the power supply voltage Vcco, a gain configured to receive the enable signal Rx_enb, and a drain connected to the sources of the transistors M2 and M3. The transistor M1 is a PMOS transistor.

The source of the transistor M2 is connected to the drain of the transistor M1 and the source of the transistor M3. The gate of the transistor M2 receives the signal P_Bias. The drain of the transistor M2 is connected to the node 322. The transistor M2 is a PMOS transistor.

The source of the transistor M3 is connected to the drain of the transistor M1 and the source of the transistor M2. The gate of the transistor M2 receives the signal P_Bias. The drain of the transistor M3 is connected to the node 322. The transistor M3 is a PMOS transistor. The transistors M2 and M3 function as bias transistors to provide a bias current to the differential amplifier circuitry 320, improving the stability of the differential amplifier circuitry 320 by aiding in the proper level shifting with the required gain for amplification by the next amplifier stage.

The transistor M4 is a PMOS transistor. The gate of the transistor M4 is connected to the node 312 and receives the adjusted signal 314, the source of the transistor M4 is connected to the node 322, and the drain of the transistor M4 is connected to the output 324 and the resistor RP.

The transistor M5 is a PMOS transistor. The gate of the transistor M5 receives the reference signal 112, the source of the transistor M5 is connected to the node 322, and the drain of the transistor M5 is connected to the output 326 and the resistor RN.

The gate of the transistor M4 receives the adjusted signal 314 and the gate of the transistor M5 receives the reference signal 112. When the voltage value of the adjusted signal 314 is greater than the voltage value of the reference signal 112, the current at node 322 flows through the transistor M5 and through the resistor RN. Accordingly, the voltage value of the differential signal 230a at the output 326 is greater than the voltage value of the differential signal 230b at the output 324. When the voltage value of the adjusted signal 314 is less than the voltage value of the reference signal 112, the current at node 322 flows through the transistor M4, and through the resistor RP. Accordingly, the voltage value of the differential signal 230b at the output 326 is greater than the voltage value of the differential signal 230a at the output 324.

The stage circuitry 220 includes amplifier circuitry 340. In one example, the amplifier circuitry 340 is differential amplifier circuitry. Further, the amplifier circuitry 340 is complementary metal-oxide-semiconductor (CMOS) amplifier circuitry. The amplifier circuitry 340 receives the differential signals 230a and 230b via inputs 222 and 224. The amplifier circuitry 340 generates the output signal 116 based on the difference in the voltage levels of the differential signals 230a and 230b to generate the output signal 116. Further, the amplifier circuitry 340 outputs the output signal 116.

Figure 6:
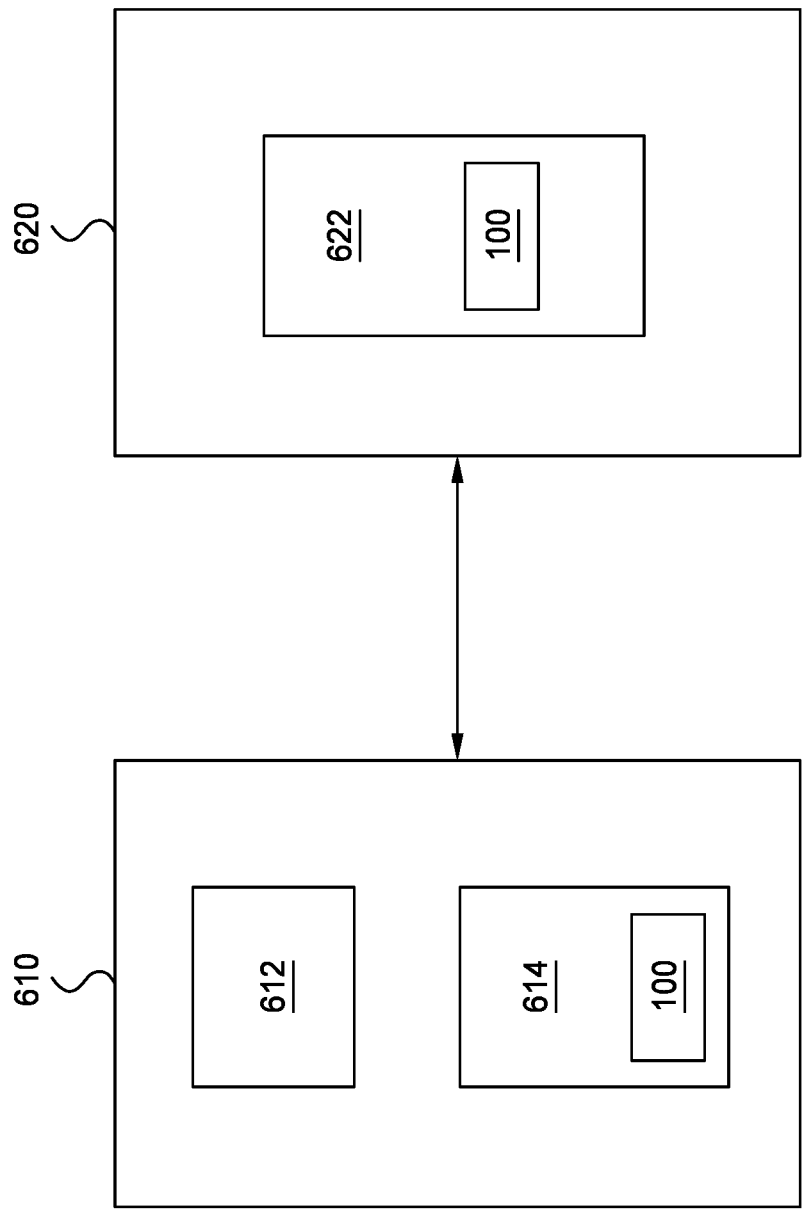
FIG. 6 depicts a block diagram of a system including a graphics processing unit and a memory device, according to an example.

FIG. 6 illustrates a graphic processing unit (GPU) 610 and a memory device 620. The GPU 610 and the memory device 620 are communicatively coupled with each other. The GPU 610 includes a display controller 612 and a HBM controller 614. In other examples, the GPU 610 may include 3D engine circuitry, and/or other elements. The display controller 612 is configured to receive display data and drive a display device based on the display data. The display controller 612 processes the display data to generate processed display data that is driven onto a display device to update the display device. In one example, the display controller 612 receives the display data from the HBM controller 614 and/or transmits display data to the HBM controller 614.

The HBM controller 614 is communicatively coupled with the memory device 620 and control the transmission of data to the memory device 620 and/or the receipt of data from the memory device 620. For example, the HBM controller 614 transmits data to be written to the memory device 620 or receives data read from the memory device 620. The HBM controller 614 includes the receiver circuitry 100. In one or more examples, the HBM controller 614 may include multiple implementations of the receiver circuitry 100. The receiver circuitry 100 receives data communicated by the memory device 620.

The memory device 620 includes memory circuitry (e.g., DRAM or another memory type) 622. The HBM controller 614 controls writing data to the memory circuitry 622 and reading data from the memory circuitry 622. In one example, the memory circuitry 622 includes the receiver circuitry 100. The receiver circuitry 100 receives data communicated from the memory circuitry 622.

Figure 7:
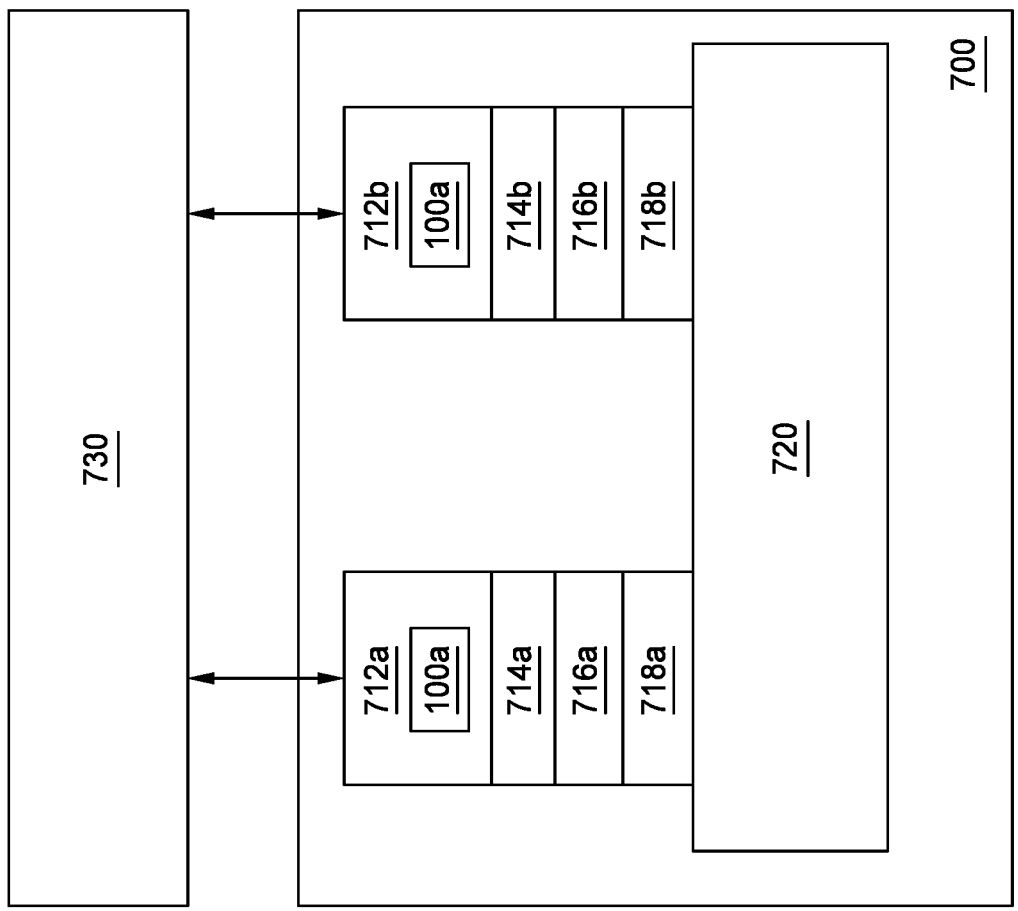
FIG. 7 depicts a block diagram of an example integrated circuit (IC) device and a memory device, according to an example.

FIG. 7 illustrates an integrated circuit (IC) device 700. The IC device 700 may be a field programmable gate array (FPGA). In one example, the IC device 700 is a system-on-chip (SoC). In other example, the IC device 700 may be another type of IC device. The IC device 700 is connected to memory circuitry 730. The IC device 700 reads data from the memory circuitry 730 and writes data to the memory circuitry 730. The memory circuitry 730 may be a DRAM. In one more examples, the memory circuitry 730 is a 3D DRAM stack.

The IC device 700 includes one or more HBM I/O devices 712. The HBM I/O devices 712a, 712b are connected to the memory circuitry 730. The HBM I/O devices 712a, 712b transmit data to the memory circuitry 730 and receives data from the memory circuitry 730.

The HBM I/O device 712a includes the receiver circuitry 100a. The receiver circuitry 100a receives data from the memory circuitry 730. The HBM I/O device 712a is connected to physical interface layer (PHY) circuitry 714a. The PHY circuitry 714a is connected to the memory controller 716a and control communication between the memory controller 716a and the HBM I/O device 712a. The memory controller 716a generates write commands indicating which data is to be written to the memory circuitry 730 and the location the data is to be written. Further, the memory controller 716a generates read commands indicating which data, and the location of the data, that is be read from the memory circuitry 730. The read and write commands are communicated to the memory circuitry 730 from the memory controller 716b via the PHY circuitry 714a and the HBM I/O device 712a.

The memory controller 716a is connected to the programmable circuitry 720 via network-on-chip (NoC) 718a. The NoC 718a provides interconnections that connect the memory controller 716a with the programmable circuitry 720. The programmable circuitry 720 may also be referred to as a programmable fabric. The programmable circuitry 720 may be programmed to perform various different processes. In one example, the programmable circuitry 720 sends a read request or write request to the memory controller 716a, from which the memory controller 716a generates corresponding read and write commands. The programmable circuitry 720 includes one or more programmable elements that can be programmed to perform various different processing related tasks.

The HBM I/O device 712b includes the receiver circuitry 100b. The receiver circuitry 100b receives data from the memory circuitry 730. The HBM I/O device 712b is connected to physical interface layer (PHY) circuitry 714b. The PHY circuitry 714b is connected to the memory controller 716b and control communication between the memory controller 716b and the HBM I/O device 712b. The memory controller 716b generates write commands indicating which data is to be written to the memory circuitry 730 and the location the data is to be written. Further, the memory controller 716b generates read commands indicating which data, and the location of the data, that is be read from the memory circuitry 730. The read and write commands are communicated to the memory circuitry 730 from the memory controller 716b via the PHY circuitry 714b and the HBM I/O device 712b.

The memory controller 716b is connected to the programmable circuitry 720 via NoC 718b. The NoC 718b provides interconnections that connect the memory controller 716b with the programmable circuitry 720. In one example, the programmable circuitry 720 sends a read request or write request to the memory controller 716b, from which the memory controller 716b generates corresponding read and write commands.

Figure 8:
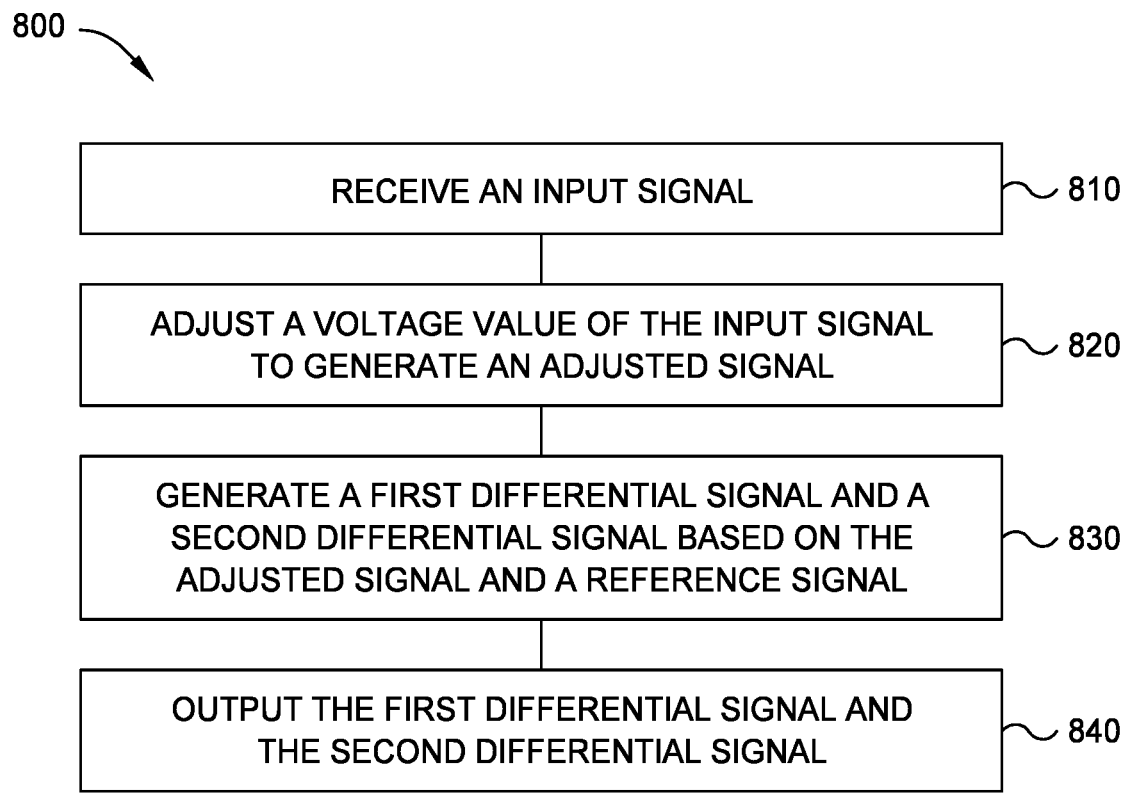
FIG. 8 depicts a flowchart of a method for operating receiver circuitry, according to an example.

FIG. 8 illustrates a flowchart of a method 800 for operating receiver circuitry of an HBM I/O device, according to one or more examples. The method 800 is described with reference to FIG. 3. At block 810 of the method 800, an input signal is received. For example, the voltage adjustment circuitry 310 receives the input signal 110 via the input 212 of the receiver circuitry 100. At block 820 of the method 800, a voltage value of the input signal is adjusted to generate an adjusted signal. For example, the voltage adjustment circuitry 310 reduces the voltage value of the input signal. The voltage adjustment circuitry 310 includes the transistor pair 311. The transistor pair 311 includes the transistor Mn1 and the transistor Mp1. The transistor Mn1 clips (e.g., reduces or attenuates) the upper voltage value (e.g., $V_1$) of the input signal 110 by the threshold voltage Vtn. Further, the transistor Mp1 clips (e.g., increases) the lower voltage value of the input signal 110 by the threshold voltage Vtp. The transistor Mn1 clips the upper voltage value of the input signal 110 based on the enable signal RX_en, and the transistor Mp1 clips the lower voltage value of the input signal based on the enable signal Rx_enb. For example, based on the enable signal Rx_en having a high voltage value (e.g., Vcco) and the enable signal Rx_enb having a low voltage value (e.g., 0V), the transistors Mn1 and Mp1 clip the upper and lower voltage values of the input signal 110 to generate the adjusted signal 314. The adjusted signal 314 transitions (e.g., swings) between $V_1$–Vtn and Vtp.

At block 830 of the method 800, a first differential signal and a second differential signal are generated based on the adjusted signal and a reference signal. The transistor M4 of the differential amplifier circuitry 320 receives adjusted signal 314 and the transistor M5 of the differential amplifier circuitry 320 receives the reference signal 112. Based on the voltage values of the adjusted signal 314 and the reference signal 112, the differential amplifier circuitry 320 generate the differential signals 230a and 230b. In one example, the upper voltage value of the adjusted signal 314 is adjusted by the transistor MnL of the voltage adjustment circuitry 310. For example, the transistor MnL reduces the upper voltage value of the adjusted signal 314 to be less than or equal to the gate drain voltage of the transistor M4.

At block 840 of the method 800, the first and second differential signals are output. The differential amplifier circuitry 320 outputs the differential signals 230a and 230b via the outputs 324 and 326, respectively. The first and second differential signals are received by the amplifier circuitry 340. The amplifier circuitry 340 generates the output signal 116 from the differential signals 230a and 230b. In one example, the output signal 116 is output to a memory device (e.g., the memory circuitry 622 of FIG. 6, or the memory circuitry 730 of FIG. 7.

An I/O device having a receiver circuitry with a transistor pair to adjust the voltage values of the voltage swing of an input device is described in the above. The receiver circuitry receives an input signal and clips the voltage values of the input signal. The voltage values of the input signal are clipped such that the voltage values of the input signal are within the operating thresholds of the transistors of the differential amplifier circuitry the receiver circuitry. The transistor pair includes a first transistor that clips (e.g., reduces) the upper voltage value of the input signal and a second transistor that clips (e.g., increases) the lower voltage value of the input signal.

While the foregoing is directed to specific examples, other and further examples may be devised without departing from the basic scope thereof, and the scope thereof is determined by the claims that follow.

What is claimed is:

1. A receiver circuitry comprising:
   first stage circuitry having a first input configured to receive an input signal, the first stage circuitry comprising:
   voltage adjustment circuitry coupled to the first input and comprising a transistor pair configured to receive the input signal, and adjust a voltage value of the input signal to generate an adjusted signal, wherein the transistor pair comprises a first transistor configured to adjust an upper voltage value of the input signal and a second transistor configured to adjust a lower voltage value of the input signal, and wherein the first transistor is serially coupled with the second transistor; and
   differential amplifier circuitry configured to receive the adjusted signal and a reference signal, and generate a first differential signal and a second differential signal based on the adjusted signal and the reference signal; and
   second stage circuitry configured to receive the first differential signal and the second differential signal, and generate an output signal based on the first differential signal and the second differential signal.

2. The receiver circuitry of claim 1, wherein adjusting the voltage value of the input signal comprises reducing the upper voltage value of the input signal and increasing the lower voltage value of the input signal.

3. The receiver circuitry of claim 1, wherein the first transistor is configured to reduce the upper voltage value of the input signal, and the second transistor configured to increase the lower voltage value of the input signal, and wherein the first transistor is is coupled between the input and the second transistor.

4. The receiver circuitry of claim 3, wherein the upper voltage value of the input signal is reduced by a threshold voltage of the first transistor and the lower voltage value of the input signal is increased by a threshold voltage of the second transistor.

5. The receiver circuitry of claim 3 further comprising a third transistor coupled between the second transistor and a ground voltage node, the third transistor configured to reduce an upper voltage of the adjusted signal.

6. The receiver circuitry of claim 5, wherein the third transistor comprises a drain coupled to the drain of the second transistor, a gate coupled to the drain of the third transistor, and a source coupled to a ground voltage node.

7. The receiver circuitry of claim 1, wherein the first transistor is an NMOS transistor and comprises a source configured to receive the input signal, a gate configured to receive a first enable signal, and a drain, and the second transistor is a PMOS transistor and comprises a source coupled to the drain of the first transistor, a gate configured to receive a second enable signal, and a drain coupled to a first node, and wherein the second enable signal is an inverted version of the first enable signal.

8. A stage circuitry comprising:
   a first input configured to receive an input signal;
   voltage adjustment circuitry coupled to the first input and comprising a transistor pair configured to receive the input signal, and adjust a voltage value of the input signal to generate an adjusted signal, wherein the transistor pair comprises a first transistor configured to adjust an upper voltage value of the input signal and a second transistor configured to adjust a lower voltage value of the input signal, and wherein the first transistor is serially coupled with the second transistor;
   differential amplifier circuitry configured to receive the adjusted signal and a reference signal, and generate a first differential signal and a second differential signal based on the adjusted signal and the reference signal;
   a first output configured to output the first differential signal; and
   a second output configured to output the second differential signal.

9. The stage circuitry of claim 8, wherein adjusting the voltage value of the input signal comprises reducing the upper voltage value of the input signal and increasing the lower voltage value of the input signal.

10. The stage circuitry of claim 8, wherein the first transistor is configured to reduce the upper voltage value of the input signal, and the second transistor is configured to increase the lower voltage value of the input signal, and wherein the first transistor is coupled between the first input and the second transistor.

11. The stage circuitry of claim 10, wherein the upper voltage value of the input signal is reduced by a threshold voltage of the first transistor and the lower voltage value is increased by a threshold voltage of the second transistor.

12. The stage circuitry of claim 10 further comprising a third transistor coupled between the second transistor and a ground voltage node, the third transistor is configured to reduce an upper voltage of the adjusted signal.

13. The stage circuitry of claim 12, wherein the third transistor comprises a drain coupled to the drain of the second transistor, a gate coupled to the drain of the third transistor, and a source coupled to a ground voltage node.

14. The stage circuitry of claim 8, wherein the first transistor is an NMOS transistor and comprises a source configured to receive the input signal, a gate configured to receive a first enable signal, and a drain, and the second transistor is a PMOS transistor and comprises a source coupled to the drain of the first transistor, a gate configured to receive a second enable signal, and a drain coupled to a first node, and wherein the second enable signal is an inverted version of the first enable signal.

15. A method comprising:
receiving, via a transistor pair of receiver circuitry, an input signal;
adjusting, via the transistor pair, a voltage value of the input signal to generate an adjusted signal, wherein the transistor pair comprises a first transistor configured to adjust an upper voltage value of the input signal and a second transistor configured to adjust a lower voltage value of the input signal, and wherein the first transistor is serially coupled with the second transistor;
generating a first differential signal and a second differential signal based on the adjusted signal and a reference signal; and
outputting the first differential signal and the second differential signal.

16. The method of claim 15, wherein adjusting the voltage value of the input signal comprises reducing the upper voltage value of the input signal and increasing the lower voltage value of the input signal.

17. The method of claim 16, wherein the first transistor is configured to reduce the upper voltage value of the input signal, and the second transistor is configured to increase the lower voltage value of the input signal, and wherein the first transistor is coupled between an input and the second transistor.

18. The method of claim 17, wherein the first transistor reduces the upper voltage value based on a threshold voltage of the first transistor, and the second transistor increases the lower voltage value based on a threshold voltage of the second transistor.

19. The method of claim 17, wherein the first transistor is an NMOS transistor and comprises a source configured to receive the input signal, a gate configured to receive a first enable signal, and a drain, and the second transistor is a PMOS transistor and comprises a source coupled to the drain of the first transistor, a gate configured to receive a second enable signal, and a drain coupled to a first node, and wherein the second enable signal is an inverted version of the first enable signal.

20. The method of claim 17 further comprising reducing, via a third transistor, an upper voltage value of the adjusted signal, wherein the third transistor is coupled between the second transistor and a ground voltage node.

* * * * *